(12) United States Patent
Wilner

(10) Patent No.: US 7,987,716 B2
(45) Date of Patent: Aug. 2, 2011

(54) COUPLED PIVOTED ACCELERATION SENSORS

(75) Inventor: Leslie Bruce Wilner, Palo Alto, CA (US)

(73) Assignee: Endevco Corporation, San Juan Capistrano, CA (US)

( * ) Notice: Subject to any disclaimer, the term of this patent is extended or adjusted under 35 U.S.C. 154(b) by 595 days.

(21) Appl. No.: 12/055,965

(22) Filed: Mar. 26, 2008

(65) Prior Publication Data

US 2009/0241669 A1  Oct. 1, 2009

(51) Int. Cl.
*G01P 15/12* (2006.01)
(52) U.S. Cl. .................................... 73/514.33
(58) Field of Classification Search ............... 73/514.33, 73/514.17, 514.18, 514.19, 514.21, 514.22, 73/514.23, 514.24; 341/145
See application file for complete search history.

(56) References Cited

U.S. PATENT DOCUMENTS

| | | | | | |
|---|---|---|---|---|---|
| 3,304,787 | A | * | 2/1967 | Chiku et al. | 73/514.33 |
| 3,948,096 | A | * | 4/1976 | Miller | 73/178 R |
| 4,336,718 | A | * | 6/1982 | Washburn | 73/497 |
| 4,342,227 | A | * | 8/1982 | Petersen et al. | 73/510 |
| 4,395,649 | A | * | 7/1983 | Thome et al. | 310/15 |
| 4,695,963 | A | * | 9/1987 | Sagisawa et al. | 700/258 |
| 4,891,984 | A | * | 1/1990 | Fujii et al. | 73/514.33 |
| 5,095,762 | A | * | 3/1992 | Holm-Kennedy et al. | 73/862.041 |
| 5,567,880 | A | * | 10/1996 | Yokota et al. | 73/514.33 |
| 5,886,615 | A | * | 3/1999 | Burgess | 338/114 |
| 5,987,921 | A | * | 11/1999 | Ueyanagi | 65/40 |
| 6,000,287 | A | * | 12/1999 | Menzel | 73/514.32 |
| 6,082,197 | A | * | 7/2000 | Mizuno et al. | 73/514.36 |
| 6,782,755 | B2 | * | 8/2004 | Tai et al. | 73/754 |
| 6,853,947 | B1 | * | 2/2005 | Horton | 702/151 |
| 7,337,668 | B2 | * | 3/2008 | Condemine et al. | 73/509 |
| 7,367,232 | B2 | * | 5/2008 | Vaganov et al. | 73/514.33 |
| 7,650,253 | B2 | * | 1/2010 | Weed et al. | 702/104 |
| 2004/0231420 | A1 | * | 11/2004 | Xie et al. | 73/514.32 |
| 2006/0117871 | A1 | * | 6/2006 | Wilner | 73/862.627 |

FOREIGN PATENT DOCUMENTS

DE   10210541 A1 *  9/2003
WO   WO 00/10195 A2   2/2000

* cited by examiner

*Primary Examiner* — Hezron Williams
*Assistant Examiner* — Samir M Shah
(74) *Attorney, Agent, or Firm* — Paul Davis; Goodwin Procter LLP

(57) ABSTRACT

A pivoted acceleration sensor has a substrate that is substantially parallel to first and second surfaces. A reference frame is provided. A first unbalanced seismic mass is suspended within the reference frame and is coupled with the reference frame through first and second strain gauges. The first and second strain gauges are located along a pivot axis of the first unbalanced seismic mass. The first and second strain gauges are first and second piezoresistors on the first surface of the substrate, A second unbalanced seismic mass is flexibly coupled with the first unbalanced seismic mass. The second unbalanced seismic mass is suspended within the reference frame and is coupled with the reference frame through third and fourth strain gauges. The third and fourth strain gauges are located along a pivot axis of the second unbalanced seismic mass. The third and fourth strain gauges are third and fourth piezoresistors on the first surface of the substrate. Metallization on the first surface of the substrate is configured to connect the first, second, third and fourth piezoresistors in a bridge configuration without crossovers.

24 Claims, 3 Drawing Sheets

COUPLED PIVOTED ACCELERATION SENSORS

BACKGROUND OF THE INVENTION

1. Field of the Invention

This invention relates generally to acceleration sensors, and more particularly to pivoted acceleration sensor coupled on a fixed reference frame without crossovers.

2. Description of the Related Art

In pressure and acceleration sensors, it is desired to produce a relatively large signal power from a relatively small amount of energy absorbed from the medium. The goal is to minimize the mechanical energy necessary to produce a desired output signal. In pressure sensors, energy is absorbed from the medium as pressure deflects a diaphragm. Generally, a bar deeply notched at the center and its ends is placed across a diaphragm. Gauges are placed on the plane surface opposite the notched bottoms. The strain of the bending bar is concentrated at the bottom of the notches. In acceleration sensors, energy is absorbed from the acceleration field as the seismic mass deflects relative to its reference frame. For example, a structure that is used features gauges that are etched free from the substrate over an elastic hinge, a so-called "freed-gauge." With the hinge carrying the transverse load and the gauges much further from the neutral axis of bending than the outer surfaces of the hinge, the gauges become the most highly strained material. In both the acceleration and pressure sensor, efficiency permits high sensitivity via a small physical size.

A common approach taken by manufacturers of transducers has been to create a large field of strained surface and to place onto the more strained areas strain gauges of a convenient size. Alternatively, structural means have been used to concentrate strain in piezoresistors. In piezoresistive sensors, signal is produced by changing the resistance of one or more strain-sensitive resistors excited by an electric current. Hence, in a simple plane diaphragm pressure sensor with embedded gauges, much of the periphery and a broad area of the center are brought to the state of strain needed to provide signal in the gauges. Although gauges are placed in areas of highest strain, much of the strain energy is expended in the periphery and center areas which lack strain gauges.

In a freed-gauge structure only the piezoresistive material sees the full level of strain; the hinge and force-gathering structures are much less strained. Though the freed strain gauge was an improvement over previous strain gauges, it is still not the optimal structure to detect strain. Manufacturing tolerances impose a minimum cross section on the freed-gauge; hence, for the required signal power, some minimum amount of material must be strained. The manufacturing process also imposes an upper limit on the resistivity in the freed gauge, which limits the gauge factor and thus, the sensitivity of the gauge. In addition, heat dissipation limits the length of a device, such that the gauges must be stitched back and forth across a gap over a hinge until there is enough total length to give the needed resistance. Thus, there is still a need for a stress concentrating structure that overcomes the short-comings of the freed-gauge structure.

SUMMARY OF THE INVENTION

Accordingly, an object of the present invention is to provide an improved acceleration sensor.

Another object of the present invention is to provide an improved translational acceleration sensor.

Yet another object of the present invention is to provide a pivoted acceleration sensor coupled on a fixed reference frame without crossovers.

These and other objects of the present invention are achieved in, a pivoted acceleration sensor with a substrate that is substantially parallel to first and second surfaces. A reference frame is provided. A first unbalanced seismic mass is suspended within the reference frame and is coupled with the reference frame through first and second strain gauges. The first and second strain gauges are located along a pivot axis of the first unbalanced seismic mass. The first and second strain gauges are first and second piezoresistors on the first surface of the substrate. A second unbalanced seismic mass is flexibly coupled with the first unbalanced seismic mass. The second unbalanced seismic mass is suspended within the reference frame and is coupled with the reference frame through third and fourth strain gauges. The third and fourth strain gauges are located along a pivot axis of the second unbalanced seismic mass. The third and fourth strain gauges are third and fourth piezoresistors on the first surface of the substrate. Metallization on the first surface of the substrate is configured to connect the first, second, third and fourth piezoresistors in a bridge configuration without crossovers.

DETAILED DESCRIPTION OF THE PREFERRED EMBODIMENTS

In one embodiment of the present invention, an apparatus and methods are provided for generating a signal in response to a translational acceleration. The signal is cancelled in response to a rotational acceleration. A full-bridge accelerometer is coupled on a fixed reference frame without crossovers.

Figure 1:
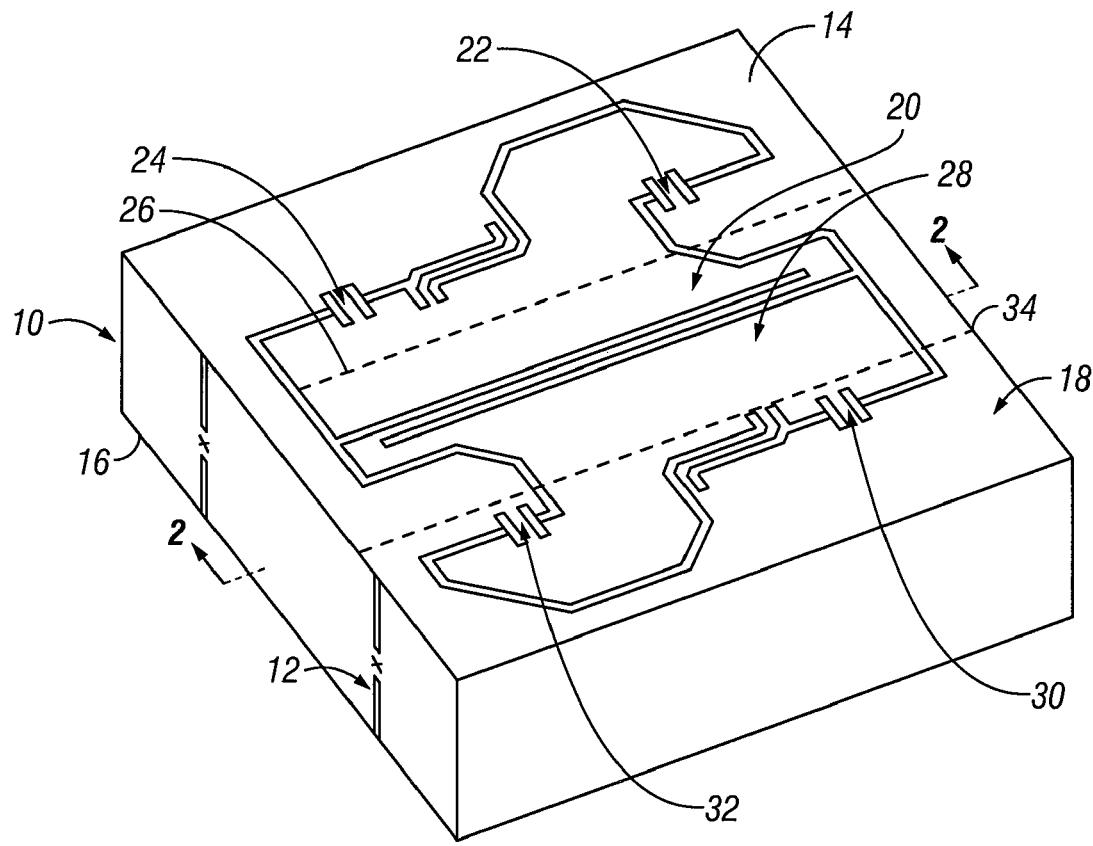
FIG. 1 illustrates one embodiment of a full-bridge accelerometer of the present invention that is coupled on a fixed reference frame without crossovers.

In one embodiment of the present invention, as set forth in FIG. 1, an apparatus 10 is a coupled pivoted acceleration sensor with a substrate 12 that is substantially parallel to first and second surfaces 14 and 16. A reference frame 18 is provided. A first unbalanced seismic mass 20 is suspended within the reference frame 18 and is coupled with the reference frame 18 through first and second strain gauges 22 and 24. The first and second strain gauges 22 and 24 are located along a pivot axis 26 of the first unbalanced seismic mass 20. The first and second strain gauges 22 and 24 are first and second piezoresistors on the first surface 14 of the substrate 12. In the FIG. 1 embodiment, the first and second piezoresistors 22 and 24 have "U" shaped configurations. It will be appreciated that the present invention is not limited to such U-shaped configurations.

A second unbalanced seismic mass 28 is flexibly coupled with the first unbalanced seismic mass 20. The second unbalanced seismic mass 28 is suspended within the reference frame 18 and is coupled with the reference frame 18 through third and fourth strain gauges 30 and 32. The third and fourth strain gauges 30 and 32 are located along a pivot axis 34 of the second unbalanced seismic mass 28, second pivot axis 34. The third and fourth strain gauges 30 and 32 are third and fourth piezoresistors on the first surface 14 of the substrate 12. Metallization on the first surface 14 of the substrate 12 is configured to connect the first, second, third and fourth piezoresistors 22, 24, 30 and 32 in a bridge configuration without crossovers.

Figure 2:
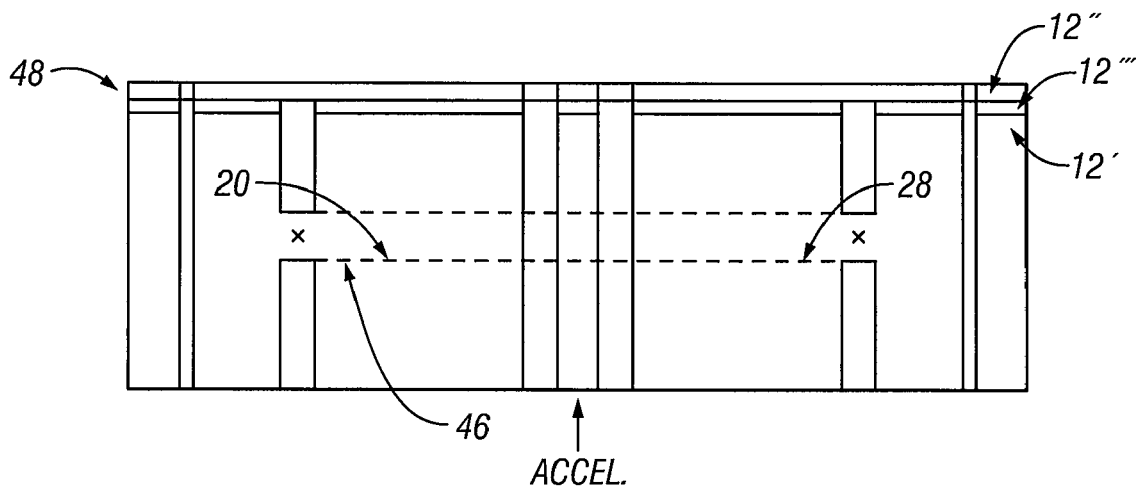
FIG. 2 is a cross-sectional view of the FIG. 1 full-bridge accelerometer.

In one embodiment of the present invention, the substrate 12 is single crystal. In another embodiment, the substrate 12 is monolithic. The single crystal substrate 12 can be a silicon substrate, such as an n-type silicon substrate 12, and the piezoresistors are p-type diffusion in the n-type silicon substrate 12. The monolithic substrate 12 can be SOI with a handle layer 12', a gauge layer 12" and an oxide barrier layer 12''' between the handle and gauge layers 12' and 12", as illustrated in FIG. 2 The gauge layer 12" can be p type silicon with piezoresistors aligned in a high sensitivity direction. The handle layer 12' can be of any orientation of any type. The p-type diffusion can have a diffusion density in a range from approximately $10^{17}$ p-type dopant atoms per cubic centimeter to approximately $10^{21}$ p-type dopant atoms per cubic centimeter.

In another embodiment, the substrate 12 is SiC or a p-type type substrate with n-type strain gauges that are oriented in the 001 plane. The strain gauges are doped in about $10^6$ to $10^{19}$ dopant atoms/cm$^3$.

For p-type silicon, silicon diffusion or SOI, (i) a resistance of each piezoresistor 22, 24, 30 and 32 can be in the range of approximately 1000 ohms to approximately 10,000 ohms, (ii) a thermal coefficient of sensitivity of a gauge factor of each piezoresistor 22, 24, 30 and 32 can be in a range from approximately 0.07% per Centigrade degree to approximately 0.25% per Centigrade degree, (iii) a thermal coefficient of resistance of each piezoresistor 22, 24, 30 and 32 can be in a range from approximately 0.1% per Centigrade degree to approximately 0.3% per Centigrade degree.

Referring again to FIG. 2, the first and second unbalanced seismic masses 20 and 28 can be configured to pivot cooperatively in response to a linear acceleration component perpendicular to the first surface 14 of the substrate 12. The first and second unbalanced seismic masses 20 and 28 are configured to pivot in opposition in response to a rotational acceleration of a reference plane, wherein an acceleration response signal is suppressed, as illustrated by the arrows.

The linear acceleration component, in a first direction, places the first and third strain gauges 22 and 30 in compression, and the second and fourth strain gauges 24 and 32 in tension. The linear acceleration component, in a second, opposite direction, places the first and third strain gauges 22 and 30 in tension and the second and fourth strain gauges 24 and 32 in compression. Measured acceleration is in an opposite direction when measured along a single axis that is perpendicular to the principal plane of the substrate 12.

Figure 3:
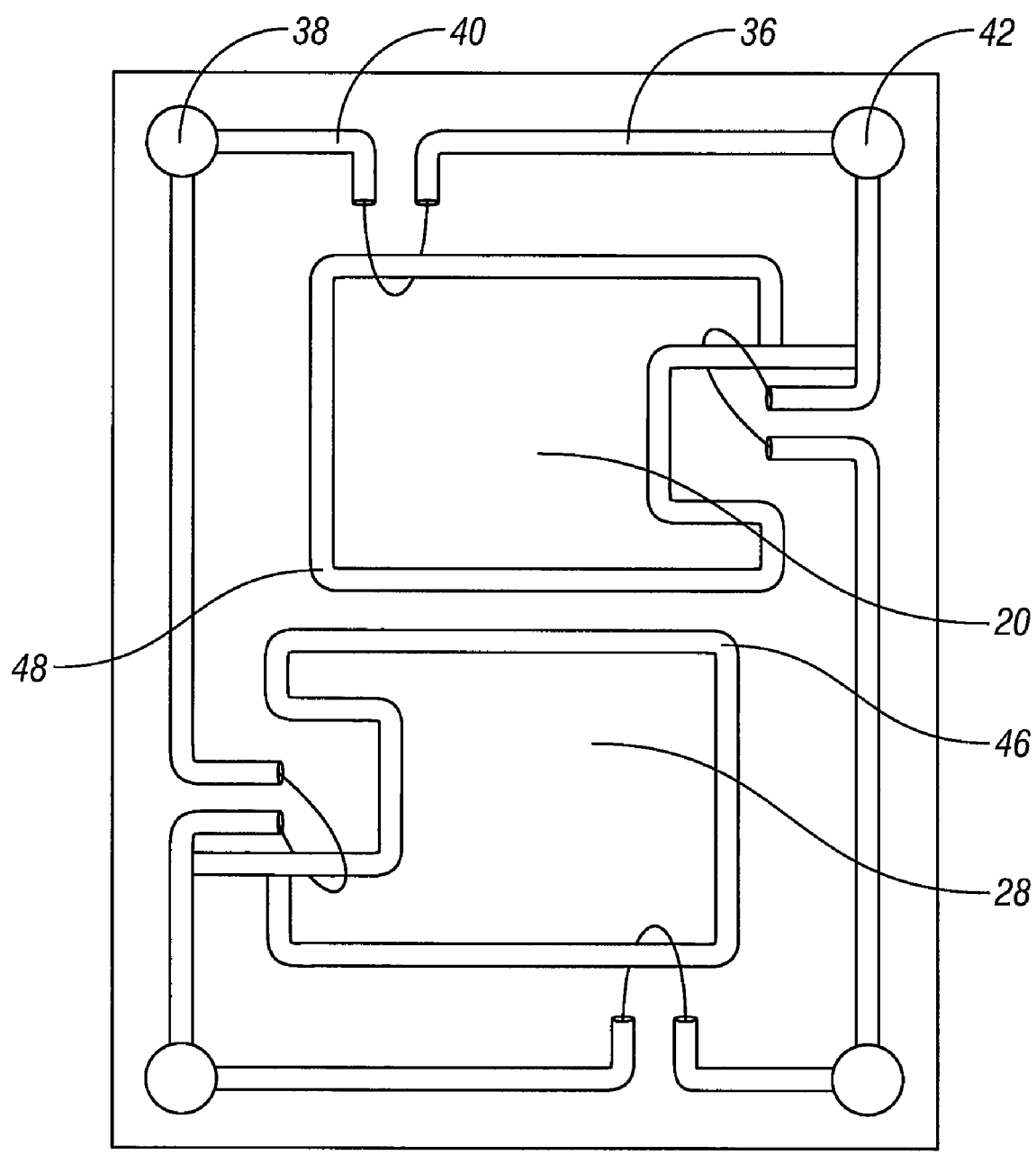
FIG. 3 illustrates one embodiment of a pivoted acceleration sensor, of the present invention, coupled on a fixed reference frame, with "U" shaped piezoresistors and without crossovers.

In one embodiment, illustrated in FIG. 3, a metallic connection 36, between the first and second piezoresistors 22 and 24 on the first unbalanced seismic mass 20, has a first bridge input node 38. A metallic connection 40, between the third and fourth piezoresistors 30 and 32 on the second unbalanced seismic mass 22, has a second bridge input node 42. A metallic connection is between the second and third piezoresistors on the reference frame 18, and has a first bridge output node.

A metallic connection is between the first and fourth piezoresistors 30 and 32 on the reference frame 18, has a second bridge output node.

Referring again to FIG. 3, in one embodiment, a first flexible coupling 44 is provided between the first and second unbalanced seismic masses 20 and 28. The first flexible coupling 44 is substantially aligned with the first pivot axis 26, disposed between the first and second strain gauges 22 and 24 and configured to provide a conductive path from the first bridge input node 38 to a first bonding pad, 40 on the reference frame 18.

Figure 4:
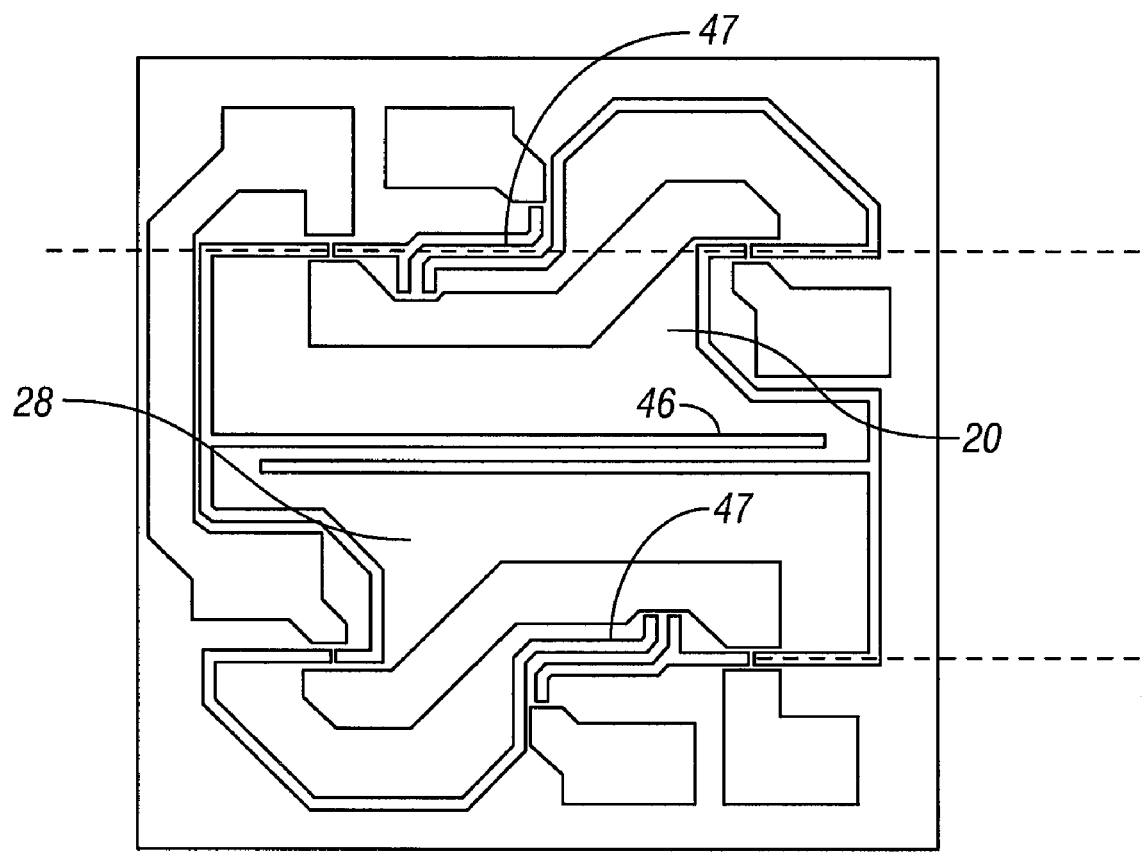
FIG. 4 illustrates another embodiment of a pivoted acceleration sensor of the present invention, coupled on a fixed reference frame, with "I" shaped piezoresistors and without crossovers

In another embodiment of the present invention, illustrated in FIG. 4, piezoresistors 22 and 24 are "I"-shaped. In this embodiment, each piezoresistor 22 and 24 has a terminal on the reference frame 18 and a terminal on a seismic mass 20 or 28. To connect the terminals on a seismic mass 20 or 24 out to the reference frame 18 and the outside world, the terminals are joined to each other with metal. The first flexible coupling 44 joins the first and second seismic masses 20 and 28 and is a mechanical coupling. Second and third flexible couplings 47 are provided that are aligned along the line of the pivot. Electrical paths are provided on the flexible couplings 47. In this embodiment, the second and third flexible couplings 47 are electrical flexible couplings. Second and third flexible couplings 47 provide a path from the junctions of the two gauge terminals on the seismic masses 20 or 28 back to a terminal connection on the reference frame 18. The second and third flexible couplings 47 extend from a seismic mass 20 or 28 to the reference frame 18 where they meet metal paths to become two of the four terminals of the Wheatstone bridge illustrated in FIG. 5.

In one embodiment, the first pivot axis 26 and the second pivot axis 34 define and lie in a pivot plane 46 that is separated from a plane 48 which includes the strain gauges. In this embodiment, the strain gauges lie about perpendicular to the pivot plane 46. Each of the first, second, third and fourth strain gauges 22, 24, 30 and 32 are a pair of piezoresistors on a corresponding pair of strain concentrators that are about perpendicular to the pivot plane 46. In one embodiment, the piezoresistors 22, 24 30 and 32 are aligned in an 111 direction and the pivot axes 26 and 34 are orthogonal to that 111 direction. In another embodiment, the piezoresistors 22, 24, 30 and 32 are aligned in an 110 direction and the pivot axis are orthogonal to that 110 direction.

Figure 5:
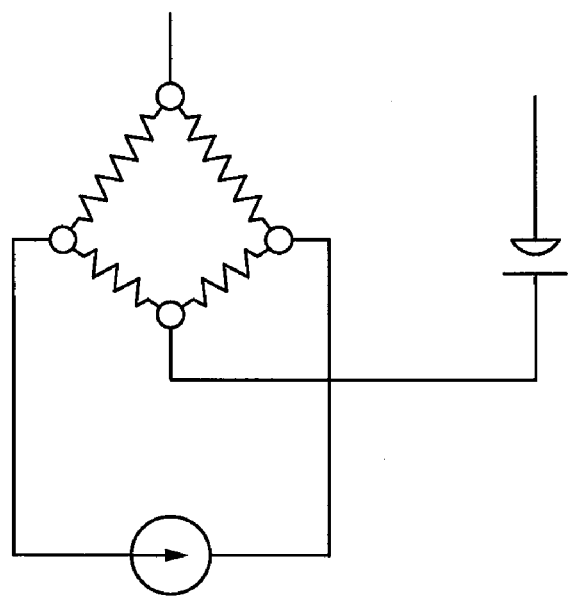
FIG. 5 illustrates an embodiment of a Wheatstone bridge of a pivoted acceleration sensor of the present invention.

As illustrated in the circuit of FIG. 5, each pair of piezoresistors is connected in series via, metallization, on a respective unbalanced seismic mass. A metallic connection, between the first and second piezoresistors on the reference frame 18, has a first bridge input node. A metallic connection, between the third and fourth piezoresistors 30 and 32 on the reference frame 18, has a second bridge input node. A metallic connection, between the second and third piezoresistors 30 and 32 on the reference frame 18, has a first bridge output node. A metallic connection, between the first and fourth piezoresistors on the reference frame 18, has a second bridge output node.

In one embodiment, a base fixture is bonded to the reference frame 18 on the second surface 16 of the substrate 12. The base fixture is a cavity configured to provide relief for deflection of the first and second unbalanced seismic masses 20 and 22. The base fixture mechanically couples the substrate 12 to an accelerated body, and thermally and electrically isolates the substrate 12 from the accelerated body. In one embodiment, the base fixture is electrically insulated from an n type body of a single crystal substrate 12 sensor.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. For example, the positioning of the LCD screen for the human interface may be varied so as to provide the best location for ergonomic use. The human interface may be a voice system that uses words to describe status or alarms related to device usage. Expected variations or differences in the results are contemplated in accordance with the objects and practices of the present invention. It is intended, therefore, that the invention be defined by the scope of the claims which follow and that such claims be interpreted as broadly as is reasonable.

What is claimed is:

1. An apparatus, comprising:
a substrate having substantially parallel first and second surfaces, comprising: a reference frame;
a first unbalanced seismic mass suspended within the reference frame and coupled with the reference frame at two separate locations through first and second strain gauges, respectively, wherein the first and second strain gauges are aligned to enable the first unbalanced seismic mass to rotate around a first common axis of the first and second strain gauges, the first and second strain gauges comprising first and second piezoresistors on the first surface of the substrate;
a second unbalanced seismic mass flexibly coupled with the first unbalanced seismic mass, the second unbalanced seismic mass suspended within the reference frame and coupled with the reference frame at two separate locations through third and fourth strain gauges, respectively, wherein the third and fourth strain gauges are aligned to enable the second unbalanced seismic mass to rotate around a second common axis of the third and fourth strain gauges, the third and fourth strain gauges comprising third and fourth piezoresistors on the first surface of the substrate; and
metallization on the first surface of the substrate configured to connect the first, second, third and fourth piezoresistors in a bridge configuration without crossovers, wherein the first and the second unbalanced seismic masses are configured to rotate cooperatively to detect acceleration in a single direction.

2. The apparatus of claim 1, wherein the substrate is a single crystal.

3. The apparatus of claim 2, wherein the single crystal substrate comprises an n-type silicon substrate, and the piezoresisitors are p-type diffusion in the n-type silicon substrate.

4. The apparatus of claim 3, wherein the p-type diffusion comprises a diffusion density in a range from approximately $10^{17}$ p-type dopant atoms per cubic centimeter to approximately $10^{21}$ p-type dopant atoms per cubic centimeter.

5. The apparatus of claim 4, wherein a resistance of each piezoresistor is in the range of approximately 1000 ohms to approximately 10,000 ohms.

6. The apparatus of claim 4, wherein a thermal coefficient of sensitivity of a gauge factor of each piezoresistor is in a range from approximately 0.07% per Centigrade degree to approximately 0.25% per Centigrade degree.

7. The apparatus of claim 4, wherein a thermal coefficient of resistance of each piezoresistor is in a range from approximately 0.1% per Centigrade degree to approximately 0.3% per Centigrade degree.

8. The apparatus of claim 2, wherein the substrate is a silicon substrate.

9. The apparatus of claim 8, wherein the piezoresistors are aligned in an 111 direction and the pivot axis are orthogonal to that 111 direction.

10. The apparatus of claim 8, wherein the piezoresistors are aligned in an 110 direction and the pivot axis are orthogonal to that 110 direction.

11. The apparatus of claim 1, wherein the first and second unbalanced seismic masses are configured to pivot cooperatively in response to a linear acceleration component perpendicular to the first surface of the substrate.

12. The apparatus of claim 11, wherein the linear acceleration component in a first direction places the first and third strain gauges in compression and the second and fourth strain gauges in tension, and wherein the linear acceleration component in a second direction places the first and third strain gauges in tension and the second and fourth strain gauges in compression.

13. The apparatus of claim 1, wherein the first and second unbalanced seismic masses are configured to pivot in opposition in response to a rotational acceleration of the reference plane, wherein an acceleration response signal is suppressed.

14. The apparatus of claim 1, wherein
a metallic connection between the first and second piezoresistors on the first unbalanced seismic mass comprises a first bridge input node,
wherein a metallic connection between the third and fourth piezoresistors on the second unbalanced seismic mass comprises a second bridge input node,
wherein a metallic connection between the second and third piezoresistors on the reference frame comprises a first bridge output node, and wherein
a metallic connection between the first and fourth piezoresistors on the reference frame comprises a second bridge output node.

15. The apparatus of claim 14, further comprising:
a first flexible coupling between the first unbalanced seismic mass and the reference frame, the first flexible coupling substantially aligned with the first pivot axis, disposed between the first and second strain gauges and configured to provide a conductive path from the first bridge input node to a first bonding pad on the reference frame;
a second flexible coupling between the second unbalanced seismic mass and the reference frame, the second flexible coupling substantially aligned with the second pivot axis, disposed between the third and fourth strain gauges and configured to provide a conductive path from the second bridge input node to a second bonding pad on the reference frame.

16. The apparatus of claim 1, wherein the first pivot axis and the second pivot axis lie in a plane separated from a plane that includes the strain gauges, wherein the strain gauges lie about perpendicular to the directions of the pivot axis.

17. The apparatus of claim 1, wherein the first pivot axis and the second pivot axis define a pivot plane, wherein each of the first, second, third and fourth strain gauges comprises a pair of piezoresistors on a corresponding pair of strain concentrators, each strain concentrator approximately perpendicular to the pivot plane.

18. The apparatus of claim 17, wherein each pair of piezoresistors is connected in series via metallization on a respective unbalanced seismic mass, wherein
a metallic connection between the first and second piezoresistors on the reference frame comprises a first bridge input node, wherein a metallic connection between the third and fourth piezoresistors on the reference frame comprises a second bridge input node, wherein a metallic connection between the second and third piezoresistors on the reference frame comprises a first bridge output node, and wherein a metallic connection between the first and fourth piezoresistors on the reference frame comprises a second bridge output node.

19. The apparatus of claim 1, wherein the substrate is monolithic.

20. The apparatus of claim 19, wherein the substrate is SOI with a handle layer, a gauge layer and an oxide barrier layer between the handle and gauge layers.

21. The apparatus of claim 20, wherein the gauge layer is p type silicon with piezoresistors aligned in a high sensitivity direction.

22. The apparatus of claim 21, wherein the handle layer is of any orientation of any type.

23. The apparatus of claim 1, further comprising a base fixture bonded to the reference frame on the second surface of the substrate, the base fixture comprising a cavity configured to provide relief for deflection of the first and second unbalanced seismic masses, the base fixture configured to mechanically couple the substrate to an accelerated body and to thermally and electrically isolate the substrate from the accelerated body.

24. The apparatus of claim 23, wherein the base fixture is electrically insulated from an n type body of a single crystal substrate sensor.

* * * * *